US009606346B2

(12) United States Patent
Paulus et al.

(10) Patent No.: US 9,606,346 B2
(45) Date of Patent: *Mar. 28, 2017

(54) INCIDENT ILLUMINATION DEVICE FOR A MICROSCOPE HAVING A PLANAR LIGHT SOURCE

(71) Applicant: Leica Microsystems (Schweiz) AG, Heerbrugg (CH)

(72) Inventors: Robert Paulus, Hergatz (DE); Harald Schnitzler, Lüchingen (CH); Reto Züst, Widnau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 94 days.

This patent is subject to a terminal disclaimer.

(21) Appl. No.: 14/418,623

(22) PCT Filed: Aug. 2, 2013

(86) PCT No.: PCT/EP2013/066316
§ 371 (c)(1),
(2) Date: Jan. 30, 2015

(87) PCT Pub. No.: WO2014/020163
PCT Pub. Date: Feb. 6, 2014

(65) Prior Publication Data
US 2015/0260971 A1    Sep. 17, 2015

(30) Foreign Application Priority Data

Aug. 3, 2012 (DE) .................. 10 2012 213 819

(51) Int. Cl.
| G02B 21/06 | (2006.01) |
| G02B 21/08 | (2006.01) |
| F21V 8/00 | (2006.01) |

(52) U.S. Cl.
CPC .......... *G02B 21/06* (2013.01); *G02B 21/082* (2013.01); *G02B 6/005* (2013.01); *G02B 6/0068* (2013.01)

(58) Field of Classification Search
CPC .... G02B 21/06; G02B 21/082; G02B 6/0068; G02B 6/005; G02B 6/0055
(Continued)

(56) References Cited

U.S. PATENT DOCUMENTS

| 5,345,333 A | 9/1994 | Greenberg |
| 6,092,904 A | 7/2000 | Tai et al. |

(Continued)

FOREIGN PATENT DOCUMENTS

| CN | 1049721 A | 3/1991 |
| DE | 8915535 | 10/1990 |

(Continued)

*Primary Examiner* — Euncha Cherry
(74) *Attorney, Agent, or Firm* — Hodgson Russ LLP

(57) ABSTRACT

The invention relates to an incident illumination device for a microscope, for viewing a sample (1) in the microscope (10), having a planar light source (100) for incident illumination of the sample (1), wherein the planar light source (100) comprises a panel-shaped light guide having a lower boundary surface (111), an upper boundary surface, and at least one lateral surface, as well as at least one light-emitting means that is arranged so that it irradiates light, via at least one lateral surface serving as a light entry surface, into the light guide in such a way that said light propagates in the light guide due to total reflection; wherein the total reflection is disrupted in defined fashion by an element abutting at the lower boundary surface of the light guide against a contact surface so that an outcoupling of light occurs at the upper boundary surface of the light guide.

17 Claims, 3 Drawing Sheets

(58) Field of Classification Search
USPC ........ 359/385, 390; 362/575, 602, 613, 97.1
See application file for complete search history.

(56) References Cited

U.S. PATENT DOCUMENTS

| | | | |
|---|---|---|---|
| 8,469,572 B2* | 6/2013 | Paulus ................. | G02B 6/0055 362/575 |
| 8,534,893 B2* | 9/2013 | Paulus ................... | G02B 21/06 359/385 |
| 2004/0130882 A1 | 7/2004 | Hara et al. | |

FOREIGN PATENT DOCUMENTS

| | | |
|---|---|---|
| DE | 19606179 | 8/1997 |
| DE | 10123785 | 11/2002 |
| DE | 10133064 | 1/2003 |
| DE | 102005029119 | 12/2006 |
| DE | 102011003568 | 3/2013 |
| DE | 102011082770 | 3/2013 |
| EP | 1515084 | 3/2005 |
| WO | 9409395 | 4/1994 |

\* cited by examiner

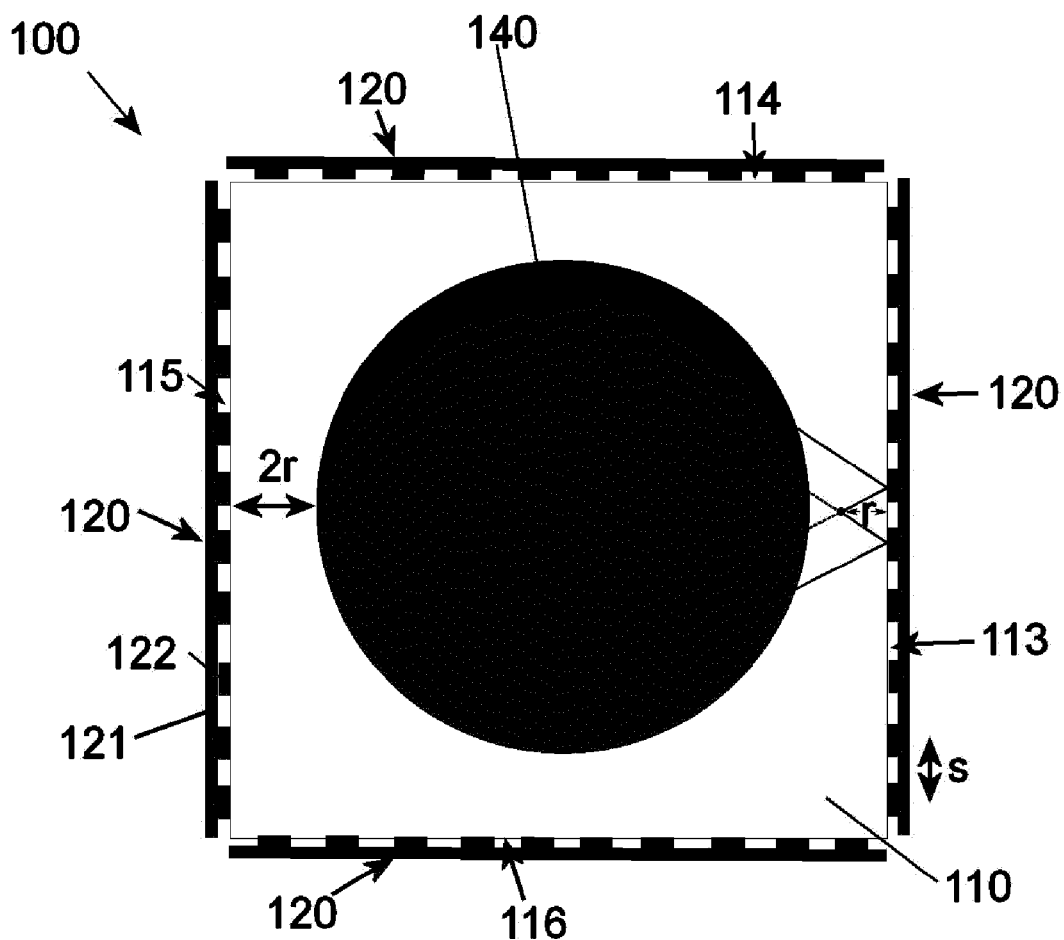
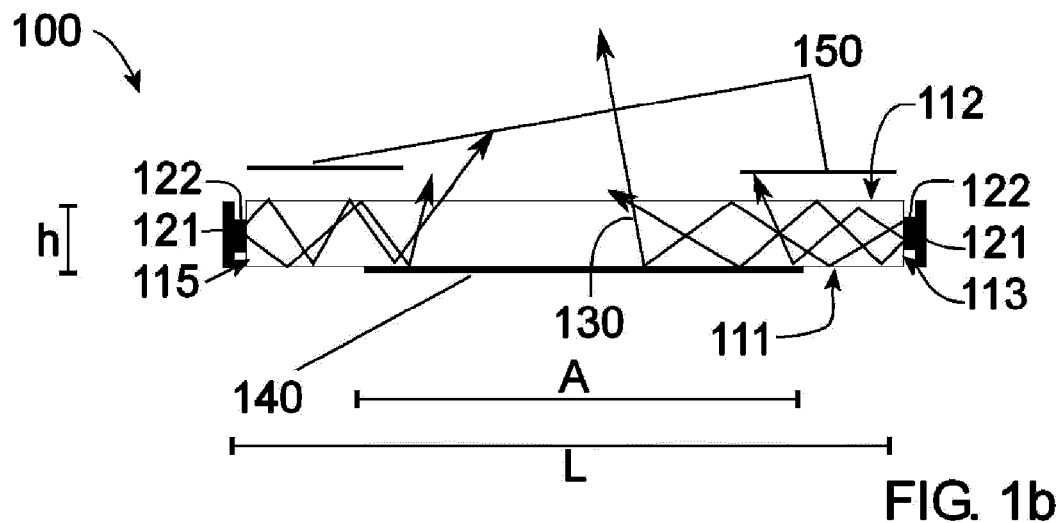
FIG. 1a
FIG. 1b

INCIDENT ILLUMINATION DEVICE FOR A MICROSCOPE HAVING A PLANAR LIGHT SOURCE

CROSS-REFERENCE TO RELATED APPLICATIONS

The present application is the U.S. national phase of International Application No. PCT/EP2013/066316 filed Aug. 2, 2013, which claims priority of German Application No. 10 2012 213 819.6 filed Aug. 3, 2012, the entirety of which is incorporated herein by reference.

FIELD OF THE INVENTION

The present invention relates to an incident illumination device for a microscope having a planar light source, in particular for a microscope having continuously modifiable magnification, called simply a "zoom microscope," in particular a stereomicroscope or macroscope; to a microscope having an incident illumination device; and to a use of a directed planar light source for incident illumination in a microscope.

BACKGROUND OF THE INVENTION

In the existing art, conventional point or spot light sources (usually halogen lamps) are used for incident illumination in microscopes having a long working distance, such as zoom microscopes; usually the object is illuminated not through the objective but separately therefrom. Light is guided directly or via a fiber bundle to the sample stage. Such illumination devices, as disclosed for example in DE 101 23 785 A1 or DE 101 33 064 A1, usually do not generate homogeneous illumination, which can result in weak contrast and possibly in illumination artifacts such as reflections, shadows, and so forth. They also require a great deal of space in the vicinity of the microscope. In addition, coupling the light source into a fiber bundle and subsequently recoupling it into a diffusing attachment results in appreciable efficiency losses.

It is desirable to describe an incident illumination device for a microscope which is as flat as possible but nevertheless homogeneous.

SUMMARY OF THE INVENTION

The present invention proposes an incident illumination device for a microscope having a planar light source, a microscope having an incident illumination device of this kind, and a use of a planar light source of this kind for incident illumination in a microscope, in accordance with the present specification.

It has been recognized, surprisingly, that a planar light source of a transmitted illumination device, as described in DE 10 2011 003 568 A1, is also particularly well suited for incident illumination. The light-emitting area is appreciably enlarged as compared with point or spot light sources, and the illuminated field becomes homogenized. This is advantageous in particular for the investigation of larger and/or multiple specimens, for example in forensics, for material investigations, etc.

A planar light source used according to the present invention is notable for the fact that light propagating in a panel-shaped light guide as a result of total reflection is coupled out by controlled disruption of total reflection. The disruption occurs at a lower boundary surface ("underside") of the light guide by means of an element abutting against a "contact surface." Light is consequently coupled out at an upper boundary surface ("upper side"). For purposes of the invention, the side at which the light emerges is thus referred to as an "upper side" regardless of its orientation in space. The element is optically coupled to the light guide and is embodied so that diffuse scattering is caused, so that out-coupling of the light at the upper side occurs. The contact surface that the element touches acts as a radiating surface. The use of a light guide that is equipped with only one contact surface for outcoupling on the one hand enables a particularly flat conformation to be obtained, and on the other hand results, because of the blending of light inside the light guide, in a first homogenization of the radiated light.

The invention allows the creation of a planar light source for incident illumination in a microscope which radiates light particularly homogeneously. The planar light source is at the same time physically very flat, and moreover is easy to manufacture and handle. Production is economical because expensive optics and complex alignment are not necessary.

Advantageous embodiments are the subject matter of the description below.

A further improvement in homogenization is achieved by the fact that the planar area of the contact surface is smaller than the planar area of the underside. An edge region thus remains which serves not for radiation but exclusively for homogenization. The light guide can therefore be selected to as large as seems necessary for homogeneity reasons, and the size of the contact surface (which defines the radiating surface) can be defined independently thereof.

Further homogenization is achieved by the fact that light is coupled into the light guide from at least two different directions. In the context of a prism-shaped or truncated pyramidal light guide, for example, i.e. a light guide having a polygonal basal surface, incoupling can occur at at least two of the lateral surfaces. With a cylindrical or frustoconical light guide, i.e. a light guide having an elliptical basal surface, incoupling occurs at at least two sites, preferably distributed uniformly over the periphery, of the enveloping surface. Incoupling from the side furthermore permits a low overall height.

The light guide is planar, so that its height is less than its lateral dimension, in particular at least by a factor of ten in one dimensional extent. The necessary overall height is thus minimized.

A particularly homogeneous radiating characteristic is achieved if the element disrupting total reflection causes a diffuse scattering of the light propagating in the light guide. The emission thereby caused substantially obeys Lambert's law, so that the radiation density in all directions is substantially constant. A scattering surface that diffuses ideally according Lambert's law re-delivers the irradiated power output, regardless of the illumination direction, in a manner distributed according to Lambert, i.e. it appears at the same brightness (constant luminance). The element disrupting total reflection preferably has a remittance adapted to the at least one light-emitting means.

The element disrupting total reflection preferably has a remittance R of between 0.3 and 0.7. This is particularly suitable for not generating a dazzle effect for the user in a context of relatively strong light-emitting means. On the other hand, a remittance R of between 0.7 and 1, in particular of more than 0.7 or more than 0.9, is also preferred in particular for weaker light-emitting means. These weaker light-emitting means can exhibit low (and therefore advantageous) heat evolution. This allows a shorter spacing between the light-emitting means and the radiating surface, and thus a compact conformation of the entire planar light source.

The element disrupting total reflection is preferably a covering applied onto the underside, in particular in the form of an applied coating or film. The covering can adhesively bonded on, painted on, spread on, or the like. The covering is preferably embodied in the form of a paste to be applied. The paste usefully has a white color in order to achieve a spectrally neutral radiating characteristic, and usefully contains a large number of reflecting centers and/or scattering centers, for example embedded molecules. In a further variant embodiment, the element disrupting total reflection can be used to modify the color of the light-emitting means (e.g. LEDs) in order to optimize the spectral radiating behavior.

The at least one light-emitting means usefully encompasses an LED or a cold-cathode tube. The configuration of the light-emitting means has a particular influence on optimization of the light power level transported in the light guide. The emission angle of the light-emitting means is preferably adapted to the geometry of the light guide; efficiency is influenced by the height of the light guide and by the spacing of the light-emitting element (e.g. chip) in the light-emitting means from the light entry surface.

Adaptation of the spacing of the light-emitting elements from one another contributes to optimum homogeneity and to minimizing the dimension of the light guide. Superimposition of the incoupled light of adjacent sources takes place only at a certain distance from the edge of the light guide, which in turn depends on the aforesaid spacing of the light sources. The planar area of the contact surface is thus, according to the present invention, smaller than the planar area of the underside so that blending is achieved.

In a particularly preferred embodiment, the panel-shaped light guide is embodied as a prism or a truncated pyramid, i.e. the basal surface defining the upper side and underside is a polygon. With this kind of embodiment, one or more lateral surfaces can each be particularly easily equipped with a light-emitting means. There are furthermore no difficulties associated with the manufacture and handling of such a shape. It is also particularly easy to provide cooling devices (heat sinks, etc.) on the flat lateral surfaces in order to cool the light-emitting means.

In an embodiment that is also preferred, the panel-shaped light guide is embodied as a cylinder or truncated cone, i.e. the basal surface defining the upper side and underside is an ellipse (including a circle). With this kind of embodiment, particularly good homogenization can be achieved if one or more light-emitting means are arranged on the periphery of the cylinder in such a way that "all-around" irradiation occurs.

The geometry and orientation of the lateral surfaces of the light guide which serve as light entry surfaces, relative to the main beam proceeding from the light-emitting means, can be used as parameters for controlling the distribution of light in the light guide and thus influencing the homogeneity of the light radiated from the planar light source. An example that may be recited here is tilting of the lateral surface serving as entry surface. This modification of the entry surface contributes to optimizing the overall height of the planar light sources, since with this feature areas of the element disrupting total reflection which are located closer to the optical axis of the microscope are better illuminated.

Preferably at least one entry surface is frosted. This homogenizes the light distribution over the solid angle in the light guide. Larger angles in the light guide are thus more heavily weighted, and the light intensity is manipulated in favor of the edge areas of the element disrupting total reflection.

It is appropriate to specifically define the optical refractive index of the element disrupting total reflection. The light of the light-emitting means is coupled laterally into the light guide and is transported by total reflection in the light guide until it is coupled upward out of the plate by means of a controlled disruption of total reflection (the element disrupting total reflection). As it enters from air into the light guide having a refractive index n1, light is refracted toward the axis. It is then either totally reflected or coupled out at the outer sides. The expression governing the acceptance angle α, which describes the maximum value at which light can be incident onto the light guide so that it is still guided, is:

$$\sin^2(\alpha) = n1^2 - n2^2,$$

in which it is assumed that incoupling into the light guide occurs through air (n=1). n2 is a possible refractive index of an adjacent medium. For the case in which the adjacent medium is air (n2=1), the acceptance angle α encompasses the entire half-space as soon as the refractive index n1 selected for the plate is greater that $\sqrt{2} \approx 1.41$ is selected. As a result of the definition of the refractive index n2>1 of the element disrupting total reflection, that portion of the angle region for which $\sin^2(\alpha) \geq n1^2 - n2^2$ is valid is coupled out. In a preferred embodiment n2≥n1, so that all the light is coupled out and scattered. This serves to increase the luminance.

For controlled influence on the directional characteristic of the planar light source, in particular when a limitation of the emission angle is desired, a light directing element can be inserted between the planar light source and illuminated object. This element causes a blockage of light having large emission angles, and allows only light having small emission angles to pass. The light directing element can be embodied as a slat structure. The large emission angles are thus blocked in only one direction. It is thereby possible to achieve a limitation of the emission characteristic in the X direction (without limitation) to a narrow angle region, e.g. from −20° to +20°. A light directing element of this kind is offered, for example, by the 3M company under the name "Vikuiti." The light directing element can alternatively also be embodied as a network structure or honeycomb structure. The large emission angles are thereby blocked in two or more directions. A preferred light directing element encompasses a number of polygonal or also round light channels through which light can pass from one side of the light directing element to the other side. Illumination outside the object field can be reduced by means of a light directing element. This feature results in an increase in contrast in the microscope image. The degree of light direction can be adapted, for example, by adapting the thickness of the light directing element or the channel dimensions, and/or by way of the distance between the planar light source and the light directing element. A desired illumination (size, brightness falloff, etc.) of a remote area can thereby be generated. No imaging of the light source by the light directing element takes place, however.

A stop for defining an emission surface is usefully provided on the upper side. If the stop is additionally mirror-coated on the side facing toward the upper side, this light component is not lost.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

BRIEF DESCRIPTION OF THE DRAWING VIEWS

The invention is schematically depicted in the drawings on the basis of exemplifying embodiments, and will be described in detail below with reference to the drawings.

FIG. 1a is a plan view of a first preferred embodiment of a planar light source used according to the present invention.

FIG. 1b is a cross-sectional view of the planar light source according to FIG. 1a.

DETAILED DESCRIPTION OF THE INVENTION

Figure 2A:
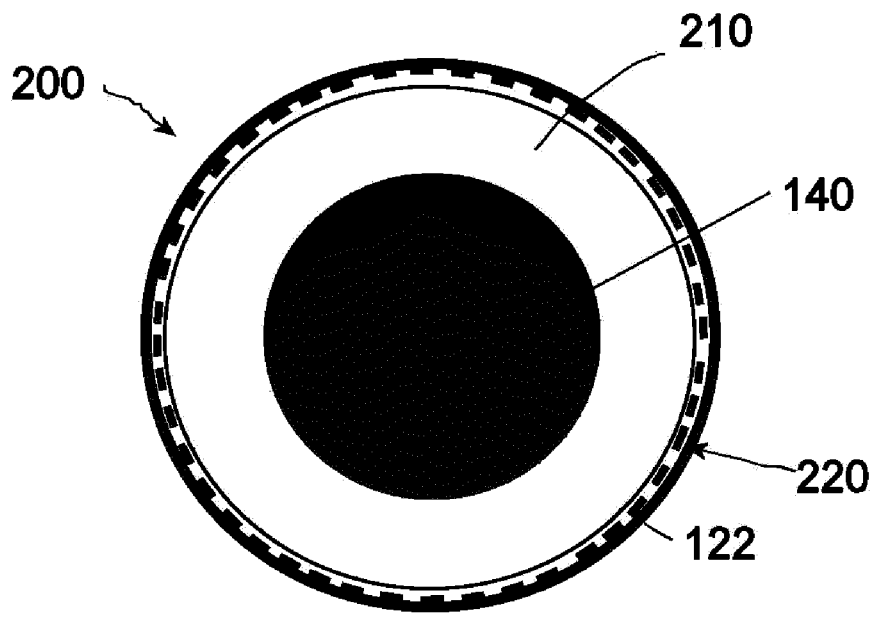
FIGS. 2a and 2b are plan views of further preferred embodiments of planar light sources used according to the present invention.

In FIGS. 1 to 4, identical elements are labeled with identical reference characters.

FIGS. 1a and 1b, in which a first preferred embodiment of a planar light source used according to the present invention for incident illumination is depicted respectively in a plan view and a cross-sectional view, are described below in continuous and overlapping fashion.

In FIG. 1, a first preferred embodiment of a planar light source, used according to the present invention for incident illumination, of a microscope is depicted schematically in a plan view and is labeled 100 in its entirety.

Planar light source 100 comprises a panel-shaped light guide 110. The panel-shaped light guide is embodied, for example, from acrylic, glass, or the like, and here has the shape of a prism, specifically a cuboid. Panel-shaped light guide 110 encompasses a lower boundary surface 111 that here is square, and a congruent upper boundary surface 112. Light guide 110 has a lateral dimension L and a height h, such that preferably $h < 0.1\ L$.

Light guide 110 further comprises four lateral surfaces 113 to 116. In the present example light-emitting means 120 are coupled onto all lateral surfaces 113 to 116. Light-emitting means 120 encompass a carrier 121, simultaneously serving as a heat sink, on which are arranged a number of light-emitting elements embodied here as light-emitting diodes 122. Light-emitting diodes 122 are arranged on light guide 110 in such a way that light 130 radiated from light-emitting diodes 122 propagates in the light guide due to total reflection. Light-emitting diodes 122 have a center-to-center spacing s from one another.

An element 140 disrupting total reflection, which is the present example is of circular configuration, abuts against lower boundary surface 111. Be it noted that a rectangular configuration is also preferred. The abutment region is referred to as a "contact surface" and has a planar area A that is smaller than the planar area $L^2$ of lower boundary surface 111. In particular, the contact surface is at a spacing 2r from the lateral surfaces serving as entry surfaces, which spacing is preferably determined as follows:

Incoupled light is refracted in the light guide, by the refractive index n, toward the vertical. Superimposition of the incoupled light of adjacent light-emitting diodes thus takes place only starting at a distance $r = s/2 * \sqrt{(n^2 - 1)}$ from the edge of the light guide. It is therefore advantageous to provide a totally reflective region at the edge of the panel so that good blending is achieved. Because of the non-isotropic angle characteristic of the light-emitting means, a width of at least 2r is typically provided for the edge zone.

The cuboidal shape of light guide 110 makes possible particularly simple handling and attachment of light-emitting means 120, since lateral surfaces 113 to 116 are flat.

In the present example, irradiation of light 130 occurs at all four lateral surfaces 113 to 116, so that for purposes of the invention, an irradiation of light from four different directions occurs. Although technically each of the individual light-emitting diodes 122 emits in an infinite number of directions, for purposes of the invention "irradiation from different directions" is to be understood to mean that the principal radiating directions of the light-emitting means are different.

Element 140 disrupting total reflection is usefully a paste applied onto lower boundary surface 111. It can also be a bonded-on film. Usefully, element 140 is substantially opaque, so that the majority of the incident light is not transmitted but rather is scattered and is not lost. The remittance is above 0.9. Element 140 acts as a diffuse scattering surface. The result is that light 130 incident onto element 140 is reflected or scattered diffusely upward; a portion leaves light guide 110 at upper boundary surface 112 and can be used for incident illumination of a sample 1 (see FIG. 3).

A stop, embodied here as aperture 150, is provided above upper boundary surface 112. That side of stop 150 which faces toward upper boundary surface 112 is mirror-coated.

In FIG. 2a a second preferred embodiment of a planar light source according to the present invention is depicted in a plan view and labeled 200. Planar light source 200 comprises a cylindrical light guide 210 that is surrounded by a number of light-emitting means 220 comprising light-emitting diodes 122. Paste 140 is once again applied on the underside of the cylindrical light guide 210.

The cylindrical shape of light guide 210, and the associated irradiation of light from all directions, result in particularly good homogenization of the emitted light.

Figure 2B:
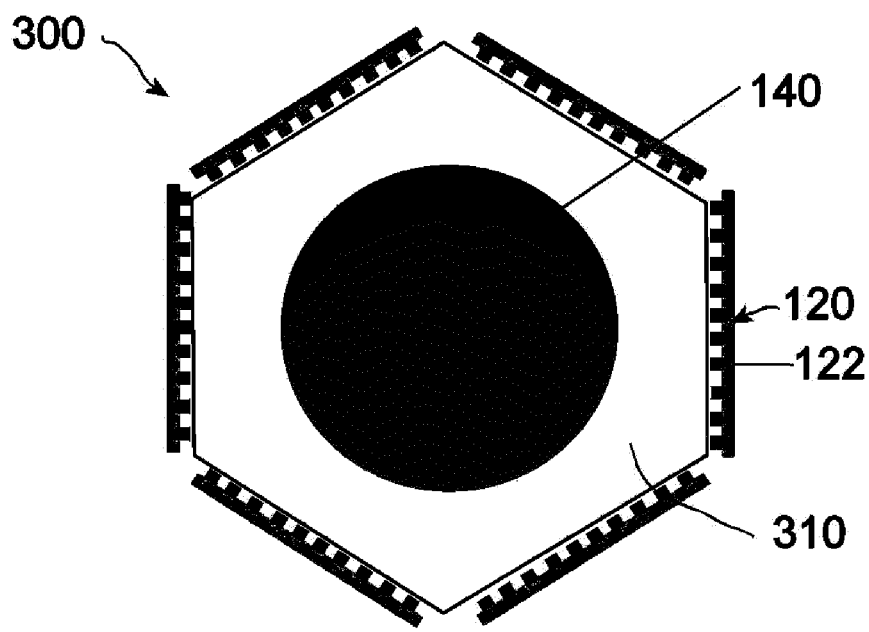

In FIG. 2b a third preferred embodiment of a planar light source according to the present invention is depicted in a plan view and labeled 300 in its entirety. Planar light source 300 once again encompasses a prism-shaped light guide 310 whose basal surface is in the shape of a regular hexagon. In the present example all six lateral surfaces of light guide 310 are equipped with light-emitting means 120, so that irradiation of light occurs from six directions. This embodiment offers on the one hand particularly good homogenization due to irradiation from many directions, and on the other hand flat lateral surfaces that allow the light-emitting means, and also holders, heat sinks, etc., to be attached in simple fashion.

Figure 3:
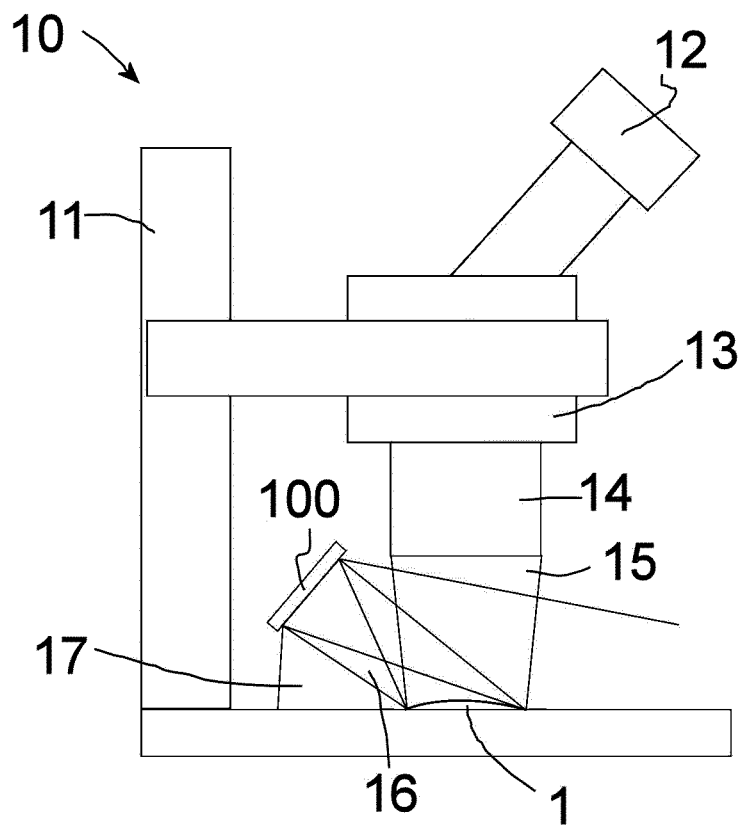
FIG. 3 is a schematic side view of a microscope having a planar light source for incident illumination.

FIG. 3 is a schematic side view of a microscope 10 having a planar light source 100 for incident illumination of a sample 1. Microscope 10 is embodied as a stereomicroscope and furthermore comprises a stand 11, an eyepiece 12, a microscope body 13 having a zoom mechanism, and an objective 14. An observation aperture is indicated as 15, an illumination aperture as 16. The entire illumination cone is labeled 17. It is evident that planar light source 100 results in very homogeneous illumination even of large-area samples 1, which is particularly advantageous for microscopes having a long working distance, such as forensic microscopes or also stereomicroscopes.

Figure 4:
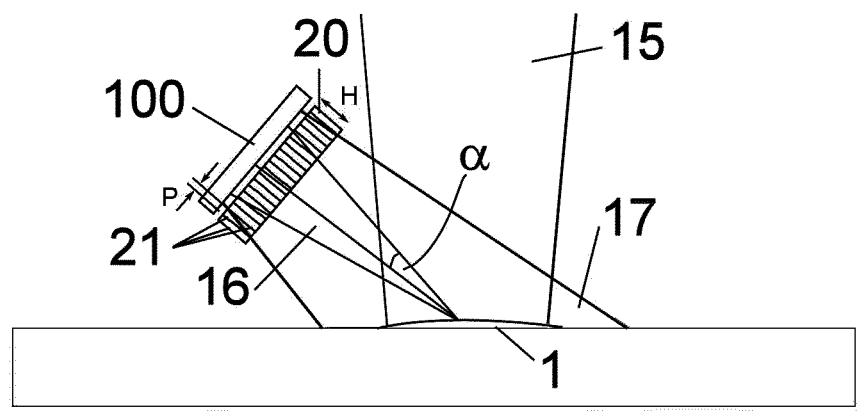
FIG. 4 shows a portion of FIG. 3 with a light directing element between the planar light source and the sample.

Light directing elements can be provided in order to reduce flare and in particular in order to enhance contrast, as depicted by way of example in FIG. 4.

In FIG. 4, a light directing element 20 is arranged between planar light source 100 and sample 1, resulting in a constriction of illumination cone 17. It is apparent that the illuminated region beyond sample 1 is made appreciably smaller, which causes a reduction in flare. Light directing element 20 is embodied here as a channel element having a number of light channels 21 arranged next to one another, which have as dimensions a height H and width P. Their length perpendicular to the drawing plane is relatively long and can correspond substantially to the dimension of the light directing element in that direction. In the embodiment as a channel element, the illumination angle α=arctan(P/H) in the drawing plane can thus be reduced almost arbitrarily. With this embodiment as a slat structure, the illumination angle perpendicular to the drawing plane remains uninfluenced. For an embodiment as a honeycomb element, a similar limitation of the illumination angle perpendicular to the drawing plane is additionally conceivable.

What is claimed is:

1. An incident illumination device for a microscope, for viewing a sample (1) in the microscope (10), having a planar light source (100; 200; 300) for incident illumination of the sample (1),
    wherein the planar light source (100; 200; 300) comprises a panel-shaped light guide (110; 210; 310) having a lower boundary surface (111), an upper boundary surface (112), and at least one lateral surface (113 to 116), as well as at least one light-emitting means (120, 122) that is arranged so that it irradiates light (130), via at least one lateral surface serving as a light entry surface, into the light guide (110; 210; 310) in such a way that said light propagates in the light guide (110; 210; 310) due to total reflection;
    wherein the total reflection is disrupted in defined fashion by an element (140) abutting at the lower boundary surface (111) of the light guide (110; 210; 310) against a contact surface (A) so that an outcoupling of light occurs at the upper boundary surface (112) of the light guide (110; 210; 310).

2. The incident illumination device according to claim 1, wherein the planar area (A) of the contact surface is smaller than the planar area of the lower boundary surface (111).

3. The incident illumination device according to claim 1, in which the at least one light-emitting means (120, 122) is arranged so that it irradiates light (130) into the light guide (110; 210; 310) from at least two different directions, via the at least one lateral surface serving as a light entry surface, in such a way that said light propagates in the light guide (110; 210; 310) due to total reflection.

4. The incident illumination device according to claim 1, wherein the element (140) disrupting total reflection causes a diffuse scattering, at the contact surface, of the light (130) propagating in the light guide (110; 210; 310).

5. The incident illumination device according to claim 1, wherein the element (140) disrupting total reflection is opaque and has a remittance R over the visible spectral region of $0.3 \leq R \leq 0.7$ or $R \geq 0.7$ or $R \geq 0.9$.

6. The incident illumination device according to claim 1, wherein the element disrupting total reflection is a covering (140) applied onto the lower boundary surface (111), in particular an applied paste.

7. The incident illumination device according to claim 1, wherein the element disrupting total reflection is a film (140) adhering to the lower boundary surface (111).

8. The incident illumination device according to claim 1, wherein the optical refractive index of the element (140) disrupting total reflection corresponds to or is greater than the optical refractive index of the light guide (110; 210; 310).

9. The incident illumination device according to claim 1, wherein the at least one light-emitting means (120) is an LED (122) or a cold-cathode tube.

10. The incident illumination device according to claim 1, wherein at least one lateral surface serving as a light entry surface encloses, with the lower boundary surface (111) and/or the upper boundary surface (112), an angle less than or greater than 90°, preferably less than 85° or greater than 95°.

11. The incident illumination device according to claim 1, wherein at least one lateral surface serving as a light entry surface is at least partly frosted.

12. The incident illumination device according to claim 1, wherein the panel-shaped light guide is in the shape of a prism (110; 310), of a truncated pyramid, of a cylinder (210), or of a truncated cone.

13. The incident illumination device according to claim 1, wherein a stop (150) for limiting the light-emitting area, or a light directing element (20) for limiting an illumination angle (α), is provided above the upper boundary surface (112).

14. The incident illumination device according to claim 13, wherein the stop (150) is mirror-coated on the side facing toward the upper boundary surface (112).

15. The incident illumination device according to claim 1, wherein a light directing element (20) for limiting an illumination angle (α) in at least one preferred direction is provided above the upper boundary surface (112).

16. A microscope (10) having an incident illumination device according to claim 1 that is configured for incident illumination of the sample (1).

17. Use of a planar light source (100; 200; 300) of an incident illumination device according to claim 1 for incident illumination in a microscope, for viewing a sample (1) in the microscope (10).

* * * * *